(12) United States Patent
Annerino et al.

(10) Patent No.: US 6,437,238 B1
(45) Date of Patent: Aug. 20, 2002

(54) LAMINATED HOUSING FOR A PORTABLE HAND HELD DEVICE

(75) Inventors: Frank Annerino, Rolling Meadows; Sajid Patel, Des Plaines; John Bryne, Lake Villa; Mark Luzbetak, Kildeer; Dan Groebe, Lake Zurich, all of IL (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/796,372

(22) Filed: Feb. 28, 2001

(51) Int. Cl.[7] .................................................. H05K 5/00
(52) U.S. Cl. ..................... 174/50; 174/66; 220/4.02; 220/241
(58) Field of Search ......................... 174/48, 50, 53, 174/58, 60, 64, 17 R, 66, 67; 248/906; 439/535; 220/3.6, 3.8, 4.02, 241, 242

(56) References Cited

U.S. PATENT DOCUMENTS 6,271,467 B1 * 8/2001 Book et al. ............. 248/906 X
6,278,062 B1 * 8/2001 Sowdon ................... 220/241 X
6,281,440 B1 * 8/2001 Baldwin et al. ............... 174/66
6,359,218 B1 * 3/2002 Koch et al. ..................... 174/50
6,362,423 B1 * 3/2002 Wise et al. ............. 220/4.02 X

* cited by examiner

Primary Examiner—Anthony Dinkins
Assistant Examiner—Dhiru R Patel
(74) Attorney, Agent, or Firm—Wagner Murabito & Hao LLP

(57) ABSTRACT

A laminated housing for a portable hand held device such as a palmtop computer. A metal front cover is bonded with a thermoplastic adhesive to a plastic midframe to form a front housing laminate. A metal rear housing member is bonded with a pressure sensitive adhesive to a plastic substrate to form a rear housing laminate. A latch arrangement including a plurality of latch fingers along the edge attach the front housing laminate with the rear housing laminate. A latch arrangement having a pair of L-shaped latch ribs that engage with a T-shaped latch member by torsion of the L-shaped latch ribs into engagement with pockets adjacent the T-shaped latch member prevent movement of the two housing laminates in relation to one another.

20 Claims, 6 Drawing Sheets

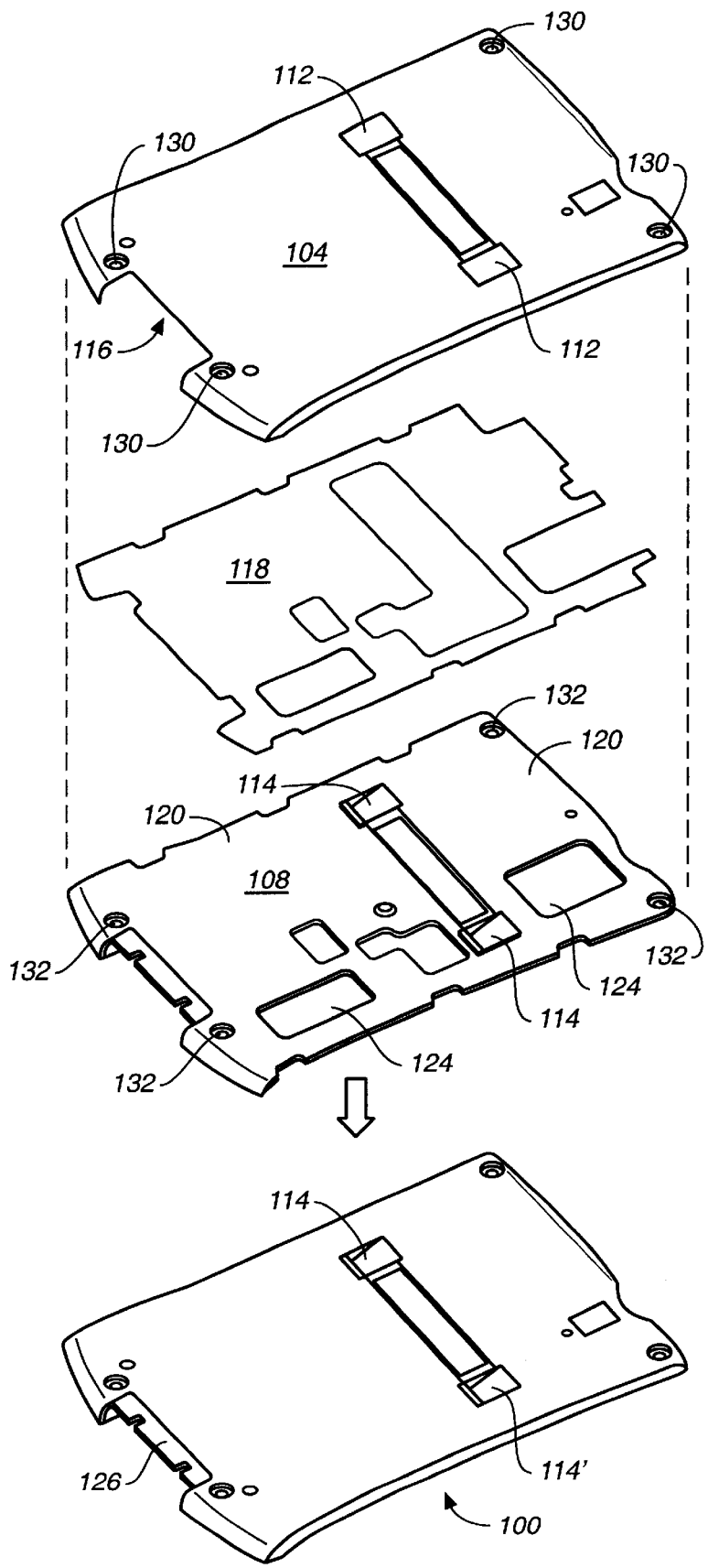
FIG._1

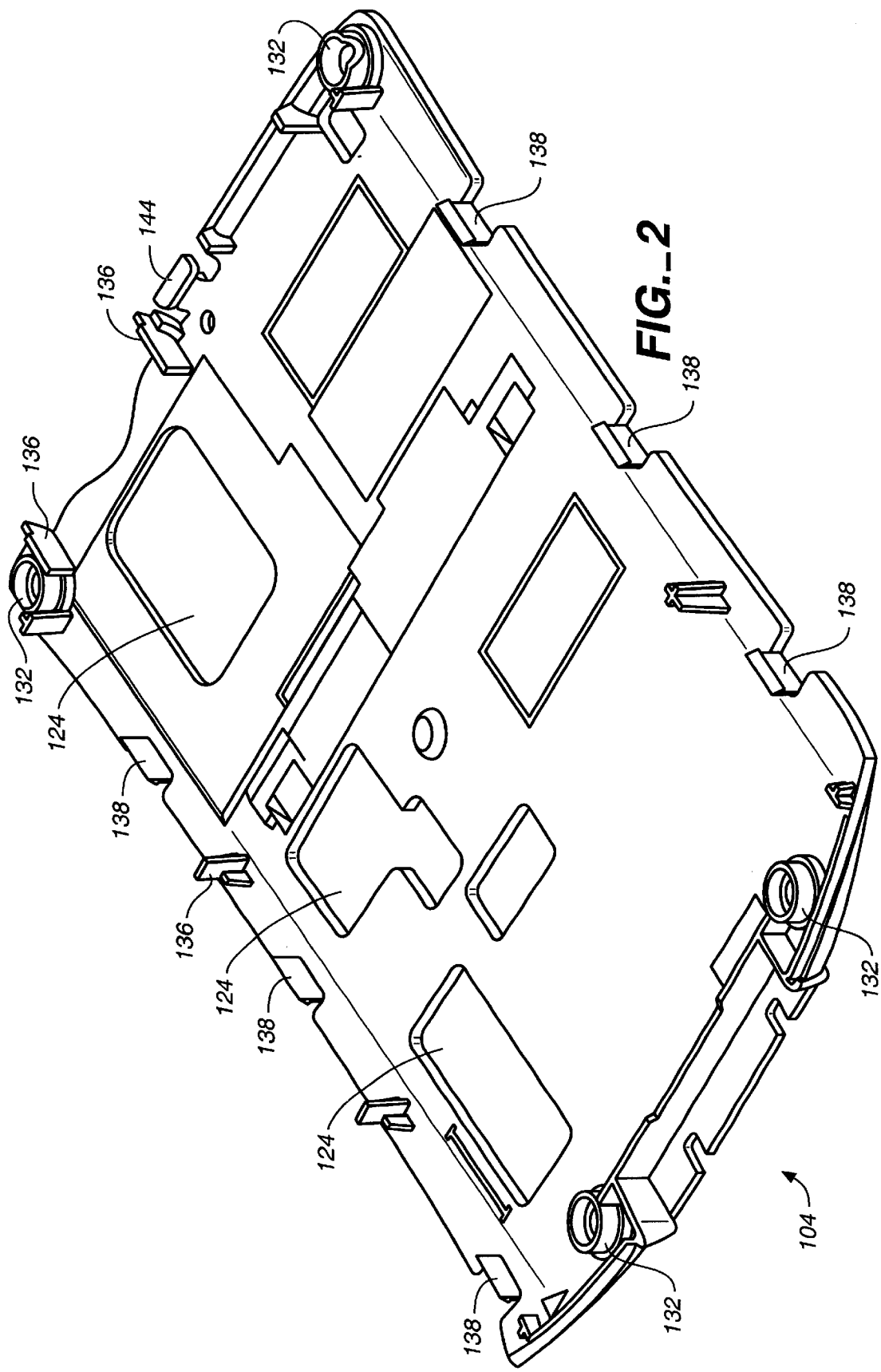

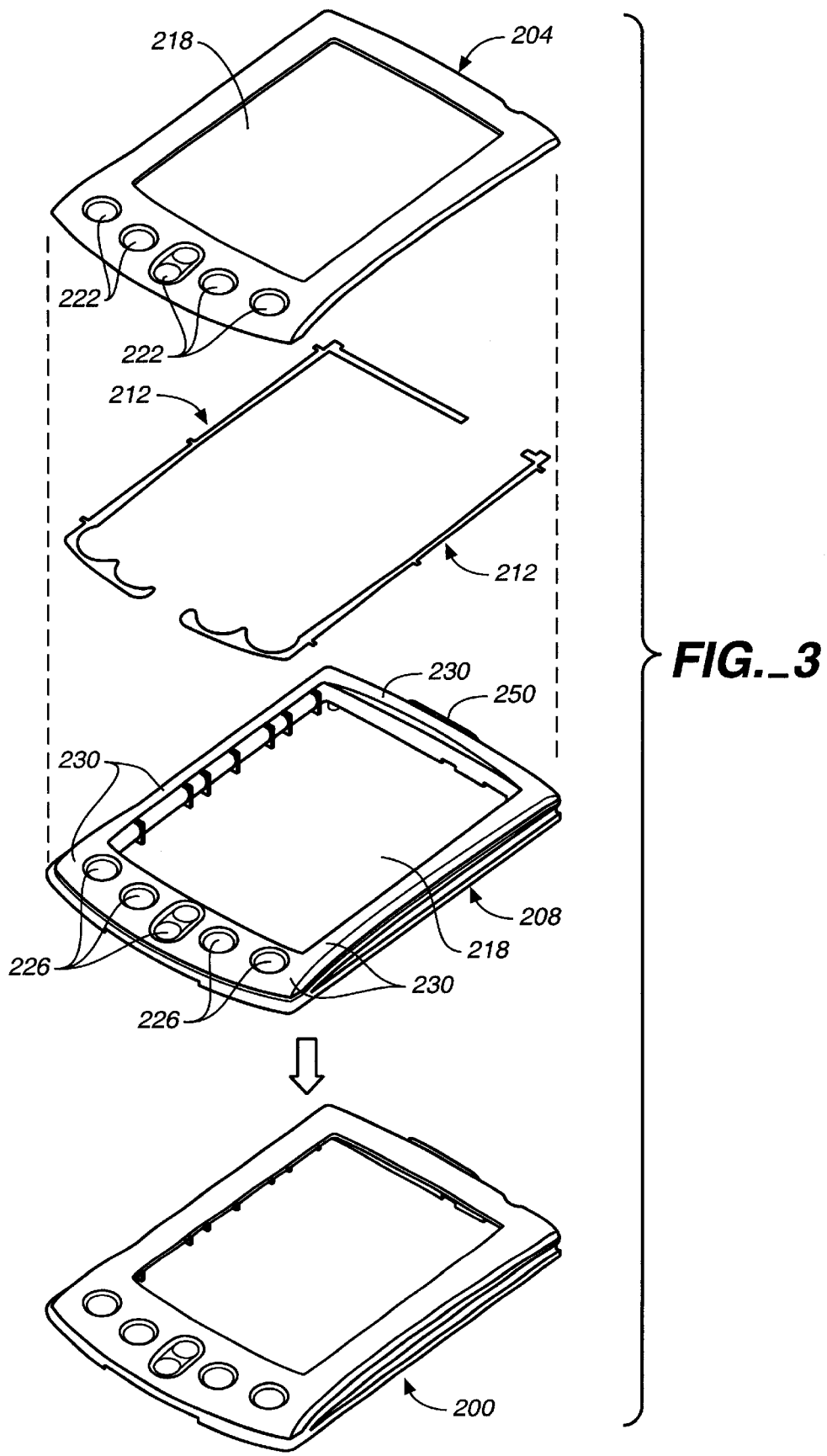
FIG._3

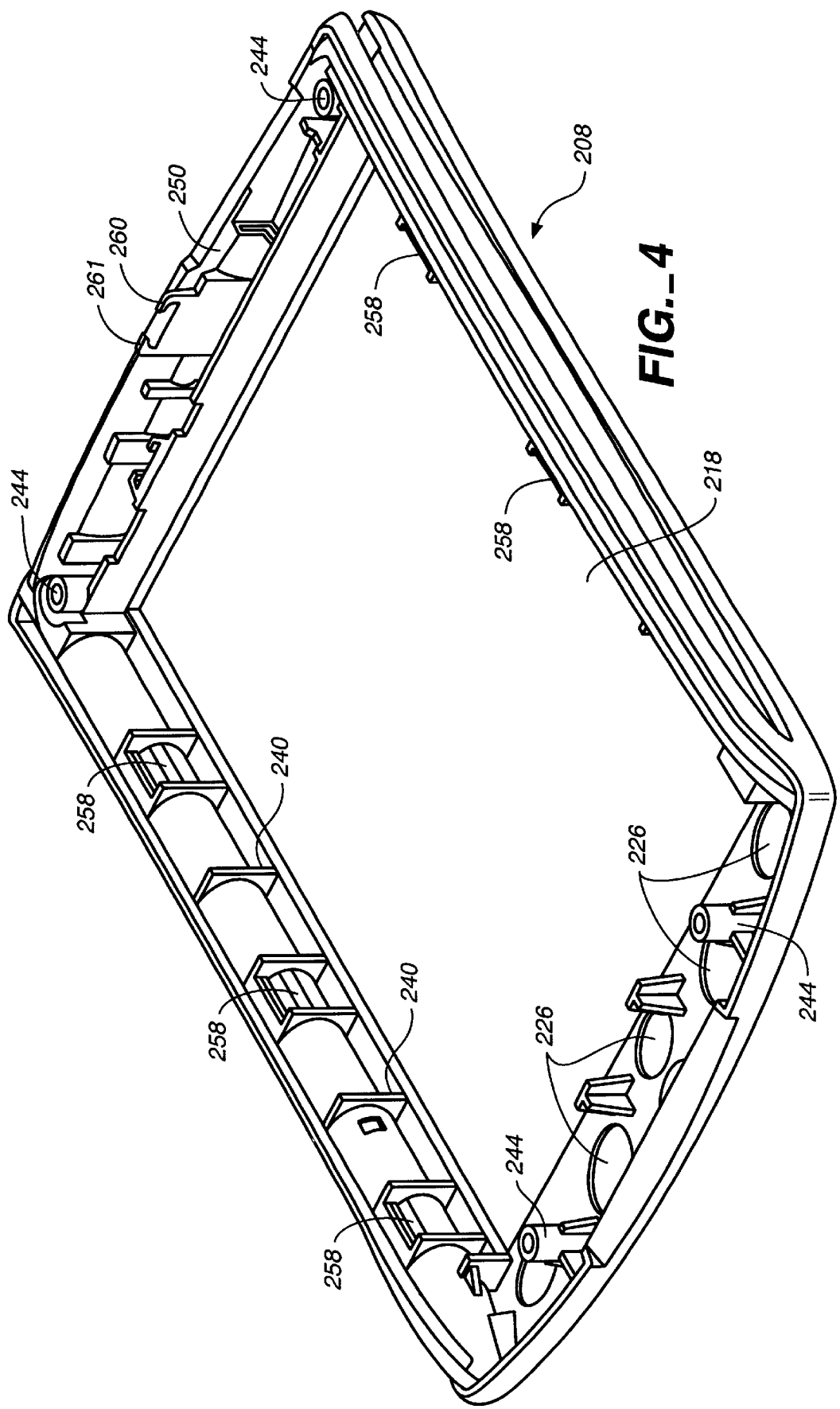
FIG._4

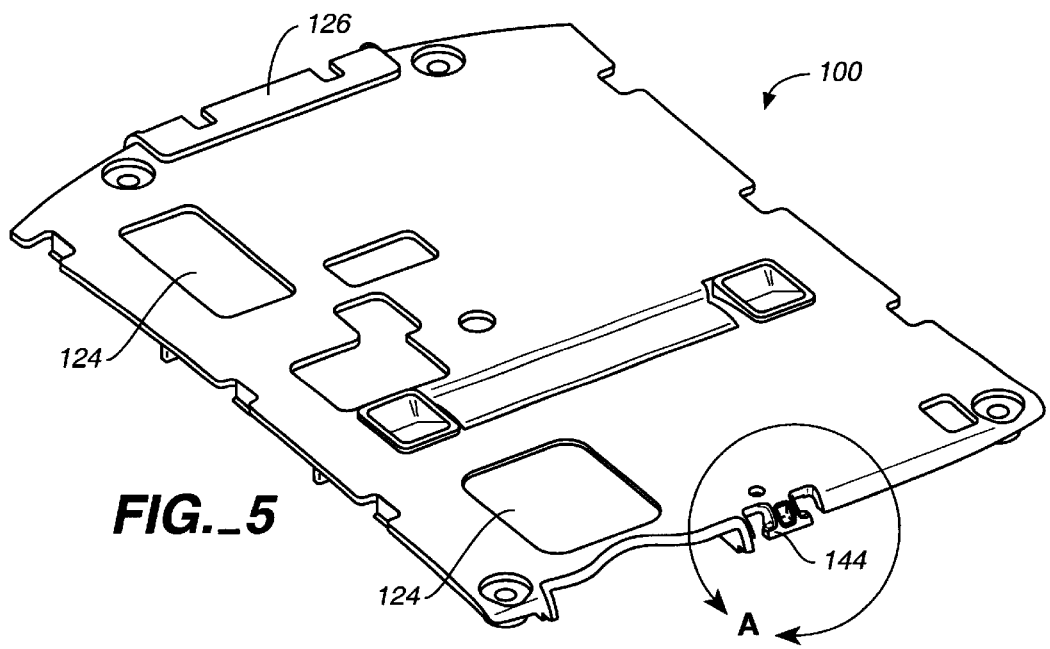
FIG._5
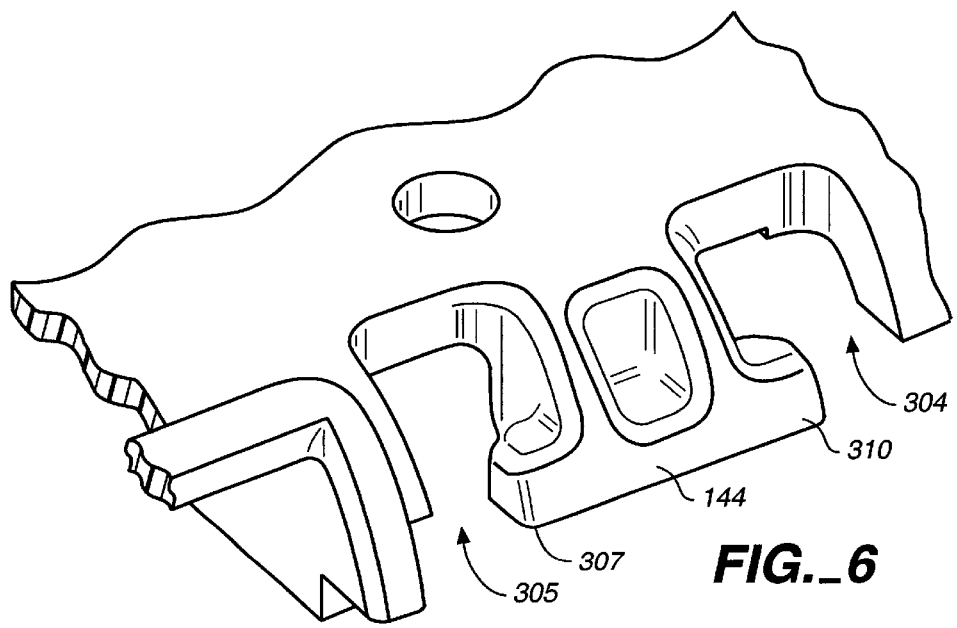
FIG._6

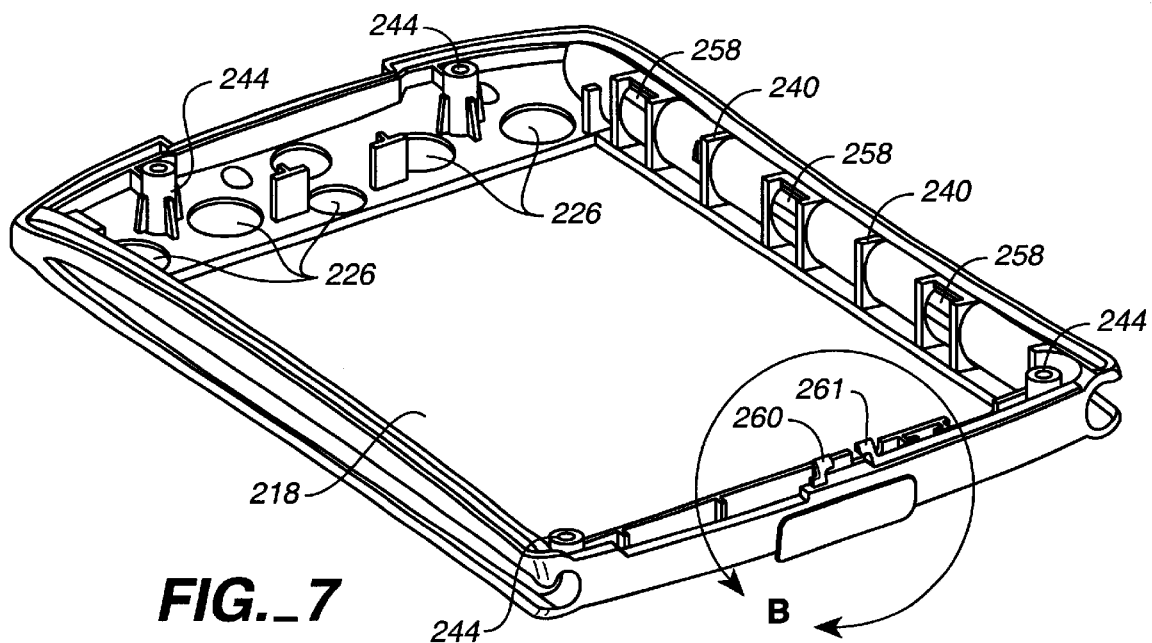
FIG._7
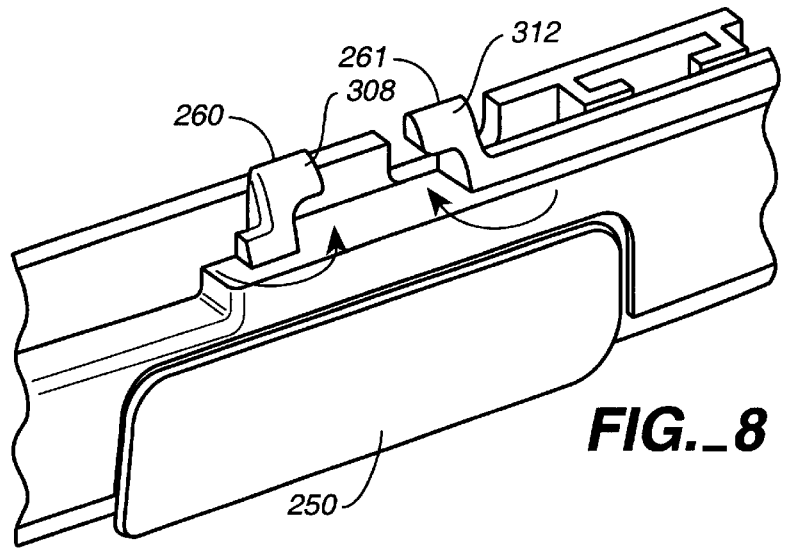
FIG._8
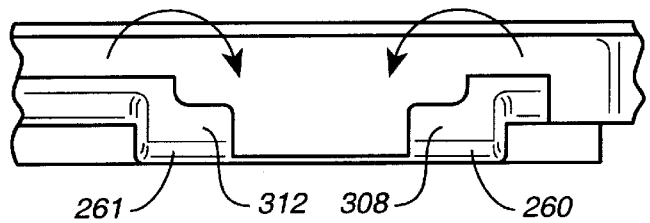
FIG._9

LAMINATED HOUSING FOR A PORTABLE HAND HELD DEVICE

FIELD OF THE INVENTION

This invention relates generally to the field of housings for portable hand held devices. More particularly, this invention relates to a plastic and metal laminated housing for a palmtop computer.

BACKGROUND OF THE INVENTION

Portable hand held devices such palmtop computers have become widely accepted as personal and business organizational tools. As such, many users constantly carry such devices with them. Such constant use requires that the housing for such devices meet a number of criteria. The housing should be aesthetically appealing. Simultaneously, the housing should be very rugged to protect the inner electronics from damage in the event of a drop. As such devices become more and more powerful, the need for strength in the housing is at odds with the need to minimize the amount of volume occupied by the housing, and thus unavailable for packaging the electronics. Moreover, any latching mechanism used to hold the housing together should minimize any volume occupied and provide a secure latching system to prevent the disengagement of the housing parts.

SUMMARY OF THE INVENTION

The present invention relates generally to a laminated housing for a portable hand held device such as a palmtop computer. Objects, advantages and features of the invention will become apparent to those skilled in the art upon consideration of the following detailed description of the invention.

In one embodiment consistent with the present invention a laminated housing for a portable hand held device such as a palmtop computer is provided. A metal front cover is bonded with a thermoplastic adhesive to a plastic midframe to form a front housing laminate. A metal rear housing member is bonded with a pressure sensitive adhesive to a plastic substrate to form a rear housing laminate. A latch arrangement including a plurality of latch fingers along the edge attach the front housing laminate with the rear housing laminate. A latch arrangement having a pair of L-shaped latch ribs that engage with a T-shaped latch member by torsion of the L-shaped latch ribs into engagement with pockets adjacent the T-shaped latch member prevent movement of the two housing laminates in relation to one another. This provides a housing arrangement and latching arrangement that has advantages such as being very strong, while providing shielding and resistance to disengagement of the housing members on impact.

In another embodiment consistent with the present invention, a laminated housing assembly for a portable hand held device includes a metal front cover having an inner surface. A plastic midframe has a front surface partially conforming to a contour of the metal front cover. A first adhesive bonds the metal front cover with the plastic midframe at the conforming contour of the front surface of the midframe to form a front housing laminate. A metal rear housing has an inner surface. A plastic substrate has a bonding surface that at least partially conforms to the inner surface of the metal rear housing. A second adhesive bonds the metal rear housing to the plastic substrate at the inner surface and bonding surface to form a rear housing laminate. The front housing laminate is mechanically fastened to the rear housing laminate. In another embodiment consistent with the present invention, a laminated housing assembly for a palmtop computer includes a metal front cover having an inner surface. A plastic midframe has a front surface partially conforming to a contour of the metal front cover. A thermoplastic adhesive bonds the metal front cover with the plastic midframe at the conforming contour of the front surface of the midframe to form a front housing laminate. A metal rear housing has an inner surface. A plastic substrate has a bonding surface that at least partially conforms to the inner surface of the metal rear housing. A pressure sensitive adhesive bonding the metal rear housing to the plastic substrate at the inner surface and bonding surface to form a rear housing laminate. The front housing laminate is mechanically attached to the rear housing laminate.

In another embodiment, a laminated housing assembly for a palmtop computer includes a metal front cover having an inner surface and an aperture. A plastic midframe has a front surface partially conforming to a contour of the metal front cover, the midframe including a support structure for supporting a circuit board and a display. An infrared lens is molded into the midframe to permit infrared signals to pass through the housing. A die cut thermoplastic adhesive layer bonds the metal front cover with the plastic midframe at the conforming contour of the front surface of the midframe to form a front housing laminate. The display is exposed through an aperture in the front housing laminate. A metal rear housing has an inner surface and at least one void therein adjacent an electrical interface. A plastic substrate has a bonding surface that at least partially conforms to the inner surface of the metal rear housing, the plastic substrate including a plurality of plastic strengthening ribs. A die cut pressure sensitive adhesive layer bonds the metal rear housing to the plastic substrate at the inner surface and bonding surface to form a rear housing laminate, wherein the plastic substrate is exposed through the void adjacent the electrical interface. A latching arrangement mechanically latches the front housing laminate to the rear housing laminate. A plurality of screws countersunk into the metal rear housing engage bosses in the midframe to hold rear housing laminate to the midframe.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 1 is an illustration of a rear housing laminate assembly and its components for a palmtop computer in accordance with an embodiment of the invention.

FIG. 2 is an illustration of the internal ribbing and support detail for the plastic substrate of FIG. 1.

FIG. 3 is a an illustration of a front housing laminate assembly and its components for a palmtop computer in accordance with an embodiment of the invention.

FIG. 4 is an illustration of the inside of the midframe showing the support and fastening detail.

FIG. 5 is an illustration of the plastic substrate of FIG. 2 from a different perspective that better illustrates detail A.

FIG. 6 shows detail A of FIG. 5.

FIG. 7 is an illustration of the midframe of FIG. 3 from a different perspective that better illustrates detail B.

FIG. 8 shows detail B of FIG. 7.

FIG. 9 is a top view of the L-shaped latch ribs indicating a direction of rotation during assembly.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

LAMINATED HOUSING FOR A PORTABLE HAND HELD DEVICE IN ACCORDANCE WITH THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The present housing arrangement provides front and rear housing laminate assemblies that are made up of a metal outer member adhesively bonded with an internal plastic member. The laminated assemblies are then attached together by a latching mechanism and mechanical fasteners to provide the finished housing.

Turning now to FIG. 1, the rear housing laminate assembly 100 is illustrated. The rear housing laminate assembly 100 is assembled from a stamped sheet metal rear outer housing member 104 and an injection molded plastic substrate 108. The metal rear housing member 104 is of substantially uniform thickness (e.g., 0.6 mm) and has an inner surface (not shown) that has a contour dictated by various functional and aesthetic considerations. Several openings may be provided in the metal rear housing member such as 112 through which the plastic of the substrate 108 protrudes when assembled at protuberances 114. Additionally, an opening 116 is provided in the bottom, in this embodiment, to provide access to electrical connections for charging, communication, etc.

The metal rear housing member 104 is bonded to a bonding surface 120 of the plastic substrate 108 using a suitable adhesive. In the preferred embodiment, the adhesive is a pressure sensitive adhesive (PSA) such as 3M 9495 pressure sensitive adhesive. This adhesive is die cut and shown as 118 to provide adhesive in the areas of the assembly where the bonding surface 120 conforms with the inner surface of the metal rear housing member 104. The two parts are bonded together by application of a suitable amount of pressure to cause the adhesive to fully bond. Those skilled in the art will appreciate that other adhesives may also be suitable.

In the present embodiment, the plastic substrate, 1084 has a thickness of approximately 1.2 mm (except in areas of ribbing, etc.). The thickness of the PSA. is approximately 0.09 mm resulting in a total thickness of the rear housing laminate 100 of about 1.89 mm. This thickness provides strength approximately equivalent to a plastic single piece assembly in the range of 2.5–3.0 mm in thickness. Moreover, openings can be provided in areas such as 124 in the plastic substrate 108 to provide for larger components (reducing localized wall thickness to that of the metal rear housing member 104) without significantly degrading the strength of the rear housing laminate assembly 100.

Once bonded together, the plastic protuberances 114 show through openings 112 to enhance the aesthetics of the laminated assembly. In addition, a plastic area 128 of the plastic substrate 108 is revealed in the area of opening 116 in the metal rear housing member to prevent the user from being exposed to potentially sharp metal edges and to provide a margin of insulation above the electrical contacts revealed by opening 116. The metal rear housing member 104 includes a plurality of countersunk openings 130 for accepting screws that pass through openings 132 in the plastic substrate so that rear housing laminate assembly 100 can be secured to the front housing laminate assembly. When the screws are passed through openings 130 and 132, the screw head rests against the metal within the countersink and therefore is able to securely hold both components 104 and 108 of the rear housing laminate assembly 100 in place.

The PSA adhesive selected provides an inexpensive bonding mechanism for the rear housing laminate assembly 100. A high degree of bond strength is not necessary for the rear housing laminate assembly 100 since the assembly 100 is held tightly together by the screws when mechanically fixed to the front housing laminate assembly.

With reference to FIG. 2, the inner surface of the plastic substrate 108 is shown to illustrate the presence of ribs 136 and other support structures used to further enhance the rigidity of the rear housing laminate assembly and provide for mechanical interface to internal components. The inner surface of plastic substrate 108 also includes a plurality of latch fingers 138. Latch fingers 138 are structured as walls protruding perpendicular to the surface of the plastic substrate 108. Each wall has a half arrow head shaped cross section at its end pointing in the direction of the wall with the trailing tip of the arrow head facing outward from the center of the housing. These latch fingers 138 are arranged in sets of three along each of two side edges of the plastic substrate 108. Also shown is a T-shaped latch member 144. The latch member 144 will be discussed later.

Referring now to FIG. 3, the front housing laminate assembly 200 is illustrated. The front housing laminate assembly 200 is produced by laminating a stamped sheet metal front cover 204 with an injection molded plastic midframe 208 using a die cut thermoplastic adhesive 212. In the present embodiment, an adhesive such as 3M 615 Thermobond™ is used to provide a high bond strength since the adhesive is the only thing holding the metal front cover 204 to the midframe 208. Other adhesives may also be suitable.

In the present application of a palmtop computer (such as those manufactured by Palm, Inc., the assignee of the present invention), the plastic midframe 208 and metal front cover 204 include a central opening 218 through which a display (e.g., an LCD display) is revealed in the final assembly. The metal front cover and the plastic midframe 208 also have a plurality of openings 222 and 226 through which various controls such as switches and buttons protrude to facilitate user control of the palmtop computer. Since the front surface of the device includes the large central opening 218 as well I as openings 222 and 226, the surface area for adhesive bonding between the metal front cover 204 and the plastic midframe 208 is limited to a relatively small bonding area 230 surrounding the openings 218 and 226 on the midframe. Thus, in order to provide the required bond strength, a high bond strength adhesive such as the thermoplastic adhesive described above is used.

The plastic midframe 208 provides support for circuit board assemblies, the display and other electronics residing within the housing and therefore spans the thickness of the housing around the periphery of the housing. Due to this thickness, the midframe renders substantial support to the thin metal front cover 204 and provides overall rigidity to the front housing laminate assembly 200 over substantially the entire surface of the metal front cover 204, in this embodiment.

FIG. 4 shows the underside of the midframe 208. A plurality of ribs 240 are provided in the midframe 208 to enhance strength while minimizing material and thus weight and volume. A latch arrangement, as will be described later, is provided in the underside of the midframe 208 to permit it to latch with a mating assembly of the rear plastic substrate 108. The relatively thick midframe 208 is also molded with screw bosses at 244 to accept screws that pass through openings 130 and 132 of the rear housing laminate assembly to secure the front and rear together once mated together by the latch assembly. Once latched and screwed together, the overall housing assembly provides a rigid structure for housing the palmtop computer. The assembly is much more rigid than could have been provided by use of either plastic or metal alone and has the advantages of providing electromagnetic shielding and electrostatic discharge protection in a thin, light, easily serviced housing with a high level of cosmetic quality with a metallic feel and an elegant user interface. An infrared lens 250 is molded into midframe 208 for use in infrared communication between the palmtop computer and the outside world. A pair of L-shaped flexing latch ribs 260 and 261 appear at the top edge of the inside edge of midframe 208. Also, a plurality of latch receiving pockets 258 reside along the edges of midframe 208.

Referring to FIG. 5 taken together with FIG. 6, a detail taken from FIG. 5, another perspective of the rear housing laminate assembly 100, is shown in larger scale in FIG. 6. This detail A shows the T-shaped latch member 144 forming a part of the rear housing laminate assembly 100 (molded into substrate 104). Adjacent each side of the T-shaped latch member 144 are a pair of pockets 304 and 305. Referring to FIG. 7 taken together with FIG. 8, a detail taken from FIG. 7, another perspective of the front housing laminate assembly 200, is shown in larger scale in FIG. 6. This detail B shows the L-shaped latch ribs 260 and 261 forming a part of the front housing laminate assembly 200.

The rear housing laminate assembly and associated T-shaped latch member are made of a plastic material such as GE CYCO™ 6800 (a blend of polycarbonate and ABS plastics). The front housing laminate assembly and associated L-shaped latch ribs are made of a plastic such as GE Lexan™ 141. Of course, all materials disclosed herein are intended to be exemplary and not limiting.

When the front housing laminate assembly 200 is assembled to the rear housing laminate assembly 100, latch fingers 138 are aligned with and snapped into engagement with latch receiving pockets 258 by flexing the latch fingers 138 inward (toward the center of the housing) until they snap into the latch receiving pockets 258. Simultaneously, the L-shaped latch ribs 260 and 261 are pressed against the T-shaped latch member and flexed as illustrated in FIG. 8 and the top view of FIG. 9 until they pass the T-shaped latch member and drop into engagement within the pockets 304 and 305. The two housing members 100 and. 200 can be disassembled by pulling from the bottom of the housing More specifically, the L-shaped latch rib 260 flexes and rotates counterclockwise during engagement as it is pressed into engagement with the mating side 307 of T-shaped latch member 144. During this process, the tapered surface 308 of L-shaped latch rib 260 slides against portion 307 of the rigid T-shaped latch member 144 causing it to rotate in the direction of the arrow until the L-shaped latch rib 260 slips into engagement into pocket 305. In a similar manner, the L-shaped latch rib 261 flexes and rotates clockwise during engagement as it is pressed into engagement with the mating side 310 of rigid T-shaped latch member 144. During this process, the tapered surface 312 of L-shaped latch rib 260 slides against portion 310 of the rigid T-shaped latch member 144 causing it to rotate in the direction of the arrow until the L-shaped latch rib 261 slips into engagement into pocket 304.

Once the L-shaped latch ribs 260 and 261 are engaged within pockets 305 and 304 respectively, any lateral shift between the front and rear housing laminates 200 and 100 respectively is inhibited by contact of the L-shaped latch ribs 260 and 261 with the walls of the pockets 305 and 304. Ribs 260 and 261 will resist. disengagement since a rotation of the L-shaped ribs is required for disengagement.

In the preferred embodiment, the T-shaped latch member has thickness within the nominal wall thickness of the substrate 104 and follows the overall contours of the internal and external surfaces of the substrate 104. The two L-shaped latch ribs 260 and 261 are also within the nominal wall thickness and their contour matches the curvature of the T-shaped latch member 144. This minimizes the amount of housing volume used by the latching system.

Since there is an L-shaped latch rib engaged on each side of the T-shaped latch member 144, the engagement between the two housing laminates is essentially doubled to significantly increase the strength of the latching system in the Z direction while simultaneously constraining movement in the X direction.

Once the front and rear housing laminates are assembled, the housing is further strengthened by installation of screws through holes 130 and 132 which are threaded into bosses 244 of the midframe 208. This secures the metal rear housing member 104 to the midframe 208 and securely sandwiches the substrate 108 therebetween to minimize any gap between the rear housing laminate 100 and the midframe 208. In the preferred embodiment, the midframe 208 and substrate 108 are made of black plastic which provides an aesthetic contrast to a silver colored metal used for the metal front cover 204 and metal rear housing member 104. Along all edges, the midframe is exposed to provide a contrasting color arrangement of black and silver. Additionally, at any area where access to the inside of the cover is provided (e.g., adjacent 116), the black plastic is advantageously used to provide a black border around the metal. This provides an aesthetic tool as well as a tool that is used to cover the metal edges of the cover 204 and housing member 104 to avoid sharp metal edges.

The L-shaped latch ribs 260 and 261 behave in a torsional manner during deflection and thus dramatically reduces the possibility of disengagement during impact. This is because there is no force applied to the L-shaped latch ribs 260 and 261 which would cause torque to be applied to them as is required to disengage them from pockets 305 and 304. This is in contrast to traditional snaps that behave as a simple cantilever during impact and relatively easily disengage due to the shift of one housing member in relation with the other. The combination of the latches 138 engaged in pockets 258 with the L-shaped latch rib engaged with the T-shaped latch member 144 of the present invention constrains the front housing laminate 200 in relation to the rear housing laminate 100 in five axes and all three rotational directions. Thus, the present latching arrangement resists shifting of the housing members in relation to one another on impact with a compact design.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A laminated housing assembly for a portable hand held device, comprising:
    a metal front cover having an inner surface;
    a plastic midframe having a front surface partially conforming to a contour of the metal front cover;
    a first adhesive bonding the metal front cover with the plastic midframe at the conforming contour of the front surface of the midframe to form a front housing laminate;
    a metal rear housing having an inner surface;
    a plastic substrate having a bonding surface that at least partially conforms to the inner surface of the metal rear housing;
    a second adhesive bonding the metal rear housing to the plastic substrate at the inner surface of the metal rear housing and bonding surface to form a rear housing laminate; and
    means for mechanically fastening the front housing laminate to the rear housing laminate.

2. The apparatus according to claim 1, wherein the midframe includes support means for supporting a circuit board and a display, and wherein the display is exposed through an aperture in the front housing laminate.

3. The apparatus according to claim 1, wherein the metal rear housing includes a void exposing the plastic substrate.

4. The apparatus according to claim 3, wherein the void in the metal rear housing exposes the plastic substrate adjacent an electrical interface.

5. The apparatus according to claim 1, wherein the plastic substrate includes a plurality of plastic ribs.

6. The apparatus according to claim 1, further comprising a plurality of screws countersunk into the metal rear housing and engaging bosses in the midframe to hold rear housing laminate to the midframe.

7. The apparatus according to claim 1, wherein the first adhesive comprises a thermoplastic adhesive.

8. The apparatus according to claim 1, wherein the second adhesive comprises a pressure sensitive adhesive.

9. A laminated housing assembly for a palmtop computer, comprising:
    a metal front cover having an inner surface;
    a plastic midframe having a front surface partially conforming to a contour of the metal front cover;
    a thermoplastic adhesive bonding the metal front cover with the plastic midframe at the conforming contour of the front surface of the midframe to form a front housing laminate;
    a metal rear housing having an inner surface;
    a plastic substrate having a bonding surface that at least partially conforms to the inner surface of the metal rear housing;
    a pressure sensitive adhesive bonding the metal rear housing to the plastic substrate at the inner surface of the metal rear housing and bonding surface to form a rear housing laminate; and
    means for mechanically fastening the front housing laminate to the rear housing laminate.

10. The apparatus according to claim 9, wherein the midframe includes support means for supporting a circuit board and a display, and wherein the display is exposed through an aperture in the front housing laminate.

11. The apparatus according to claim 9, wherein the metal rear housing includes a void exposing the plastic substrate.

12. The apparatus according to claim 11, wherein the void in the metal rear housing exposes the plastic substrate adjacent an electrical interface.

13. The apparatus according to claim 9, wherein the plastic substrate includes a plurality of plastic ribs.

14. The apparatus according to claim 9, further comprising a plurality of screws countersunk into the metal rear housing and engaging bosses in the midframe to hold rear housing laminate to the midframe.

15. The apparatus according to claim 9, further comprising an infrared lens molded into the midframe to permit infrared signals to pass through the housing.

16. The apparatus according to claim 9, wherein the plastic midframe is injection molded from a blend including polycarbonate.

17. The apparatus according to claim 9, wherein the plastic substrate is injection molded.

18. A laminated housing assembly for a palmtop computer, comprising:
    a metal front cover having an inner surface and an aperture;
    a plastic midframe having a front surface partially conforming to a contour of the metal front cover, the midframe including support means for supporting a circuit board and a display;
    an infrared lens molded into the midframe to permit infrared signals to pass through the housing;
    a die cut thermoplastic adhesive layer bonding the metal front cover with the plastic midframe at the conforming contour of the front surface of the midframe to form a front housing laminate, and wherein the display is exposed through an aperture in the front housing laminate;
    a metal rear housing having an inner surface and at least one void therein adjacent an electrical interface;
    a plastic substrate having a bonding surface that at least partially conforms to the inner surface of the metal rear housing, the plastic substrate including a plurality of plastic strengthening ribs;

a die cut pressure sensitive adhesive layer bonding the metal rear housing to the plastic substrate at the inner surface of the metal rear housing and bonding surface to form a rear housing laminate, wherein the plastic substrate is exposed through the void adjacent the electrical interface;

latching means for mechanically latching the front housing laminate to the rear housing laminate; and a plurality of screws countersunk into the metal rear housing and engaging bosses in the midframe to hold rear housing laminate to the midframe.

19. The apparatus according to claim 18, wherein the plastic midframe is injection molded from a blend including polycarbonate.

20. The apparatus according to claim 18, wherein the plastic substrate is injection molded.

* * * * *